(12) United States Patent
Artes et al.

(10) Patent No.: US 12,009,644 B2
(45) Date of Patent: Jun. 11, 2024

(54) RACKING SYSTEM FOR ELECTRICAL EQUIPMENT

(71) Applicant: ULC TECHNOLOGIES, LLC, Hauppauge, NY (US)

(72) Inventors: Benjamin Artes, Nesconset, NY (US); Benjamin J. Lagosz-Sinclair, North Baldwin, NY (US); Aalap Rajendra Shah, Westbury, NY (US); John Jayne, Hauppauge, NY (US); Dennis John Semet, New Hyde Park, NY (US)

(73) Assignee: ULC TECHNOLOGIES, LLC, Hauppauge, NY (US)

( * ) Notice: Subject to any disclaimer, the term of this patent is extended or adjusted under 35 U.S.C. 154(b) by 657 days.

(21) Appl. No.: 17/015,790

(22) Filed: Sep. 9, 2020

(65) Prior Publication Data
US 2021/0075200 A1 Mar. 11, 2021

Related U.S. Application Data

(60) Provisional application No. 62/897,747, filed on Sep. 9, 2019.

(51) Int. Cl.
*H02B 3/00* (2006.01)
*B25J 15/00* (2006.01)
*B25J 19/02* (2006.01)

(52) U.S. Cl.
CPC ............ *H02B 3/00* (2013.01); *B25J 15/0028* (2013.01); *B25J 19/022* (2013.01); *Y10T 29/5313* (2015.01)

(58) Field of Classification Search
CPC ........ H02B 11/133; H02B 1/205; H02B 3/00; H02B 11/127; Y10T 29/5313
USPC ......... 29/729, 270, 622, 756, 762, 764, 788, 29/876
See application file for complete search history.

(56) References Cited

U.S. PATENT DOCUMENTS

| | | | |
|---|---|---|---|
| 8,063,323 B1 | 11/2011 | Ledbetter | |
| 8,151,452 B2 | 4/2012 | Ledbetter | |
| 8,161,631 B1 | 4/2012 | Ledbetter et al. | |
| 8,164,875 B1 | 4/2012 | Ledbetter et al. | |
| 8,307,545 B1 * | 11/2012 | Ledbetter ............. | H02B 11/127 200/50.21 |
| 8,465,305 B2 | 6/2013 | Wilkie et al. | |
| 9,059,530 B2 | 6/2015 | Byrne et al. | |
| 10,873,177 B2 * | 12/2020 | Lagosz-Sinclair ....... | H02B 3/00 |
| 2018/0205207 A1 | 7/2018 | Lagosz-Sinclair et al. | |

OTHER PUBLICATIONS

CBS ArcSafe, Inc., Remote Circuit Breaker Racking System Brochure, retrieved from https://cbsarcsafe.com/products/remote-racking-solutions/remote-racking-systems/rrs-1/ on Jan. 18, 2018 (8 pages).
Powell Electrical Systems, Inc., Instruction Bulletin—01.41B. 65220, Lift Devices, Jun. 2017 (34 pages).

* cited by examiner

*Primary Examiner* — Thiem D Phan
(74) *Attorney, Agent, or Firm* — HUSCH BLACKWELL LLP

(57) ABSTRACT

A robotic system is configured to autonomously or semi-autonomously rack a circuit breaker from an electrical cabinet or other electrical-connection station. The robotic system may perform work on circuit breakers, ground-and-test devices, or other electrical equipment.

11 Claims, 4 Drawing Sheets

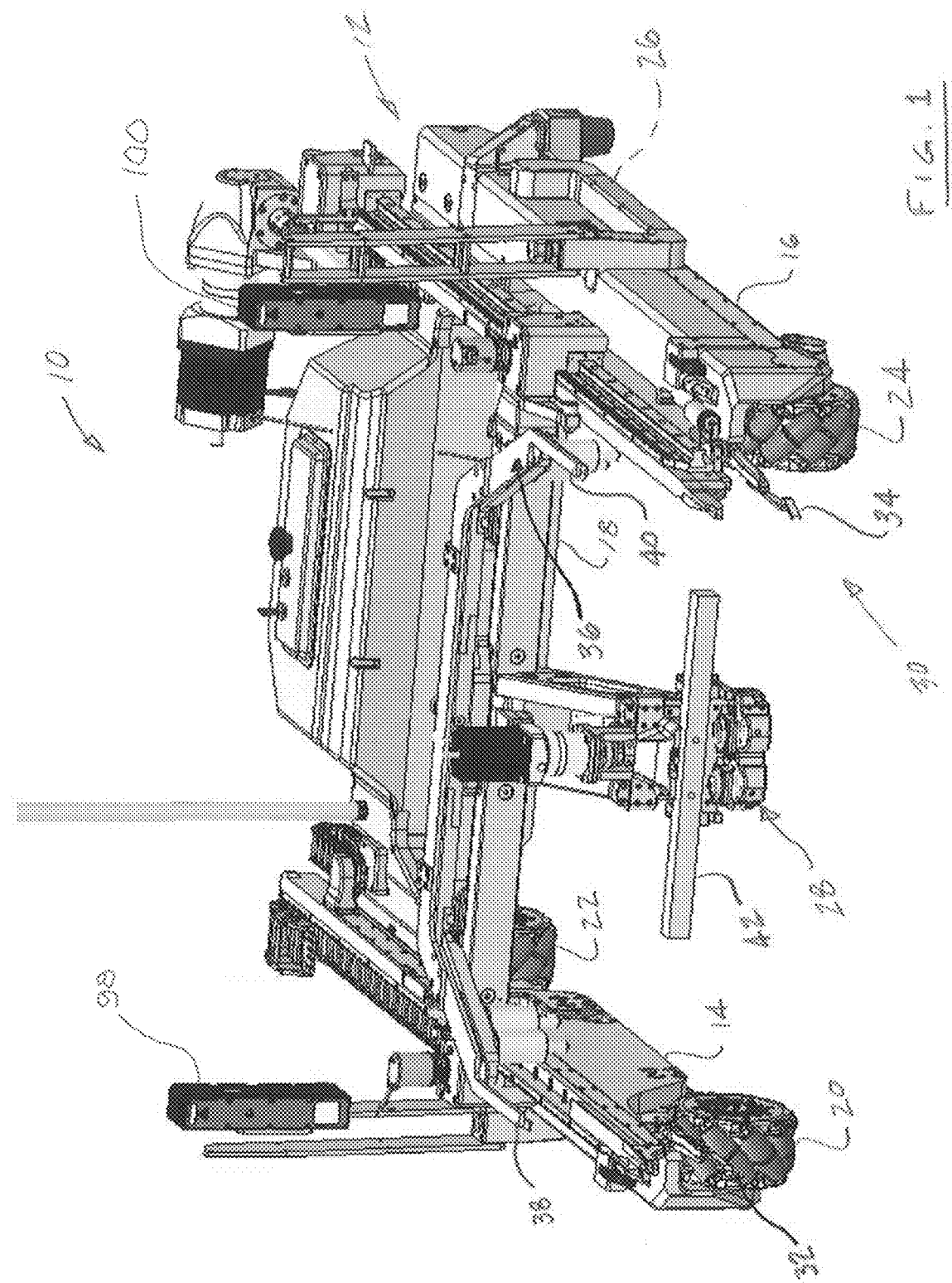

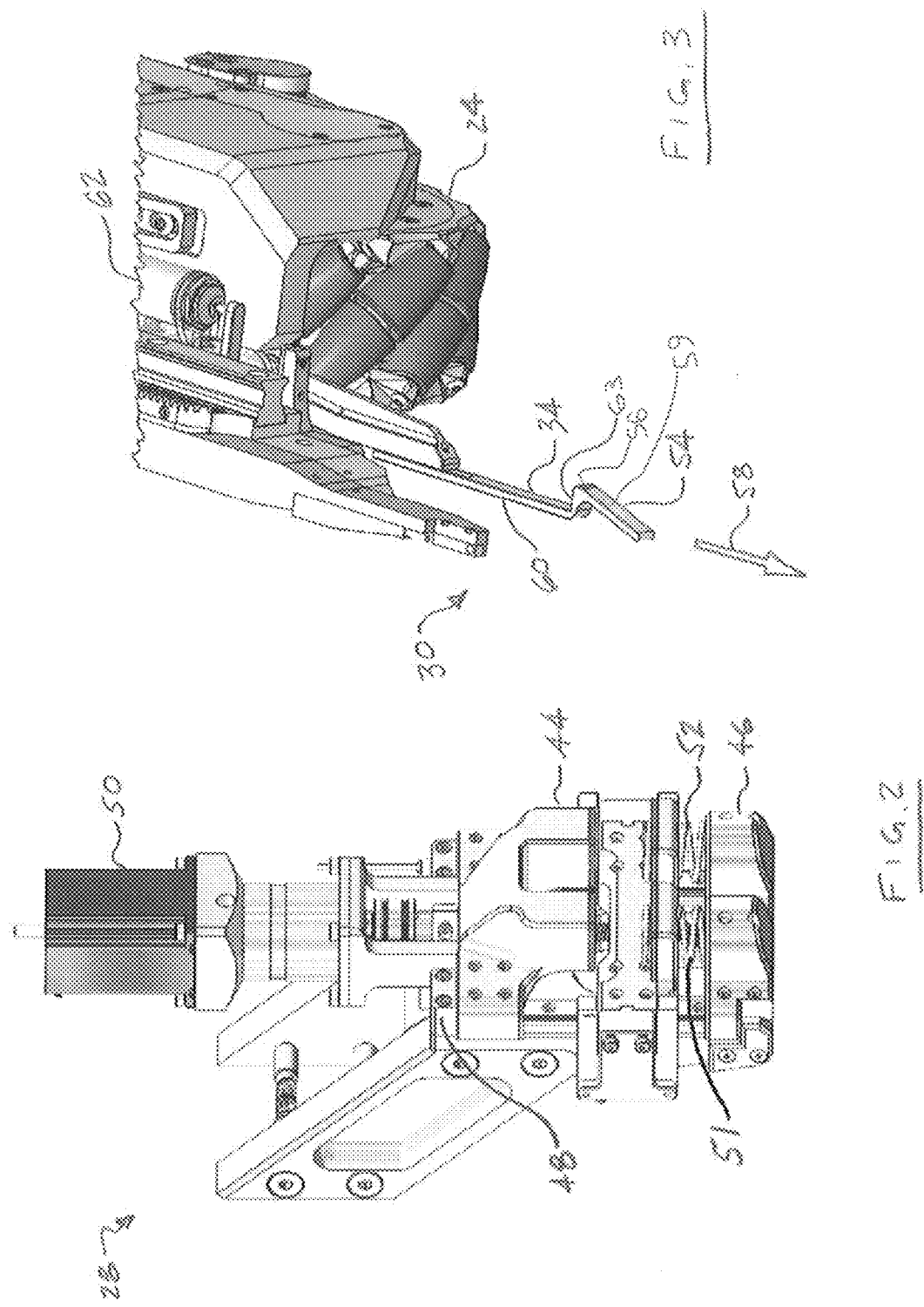

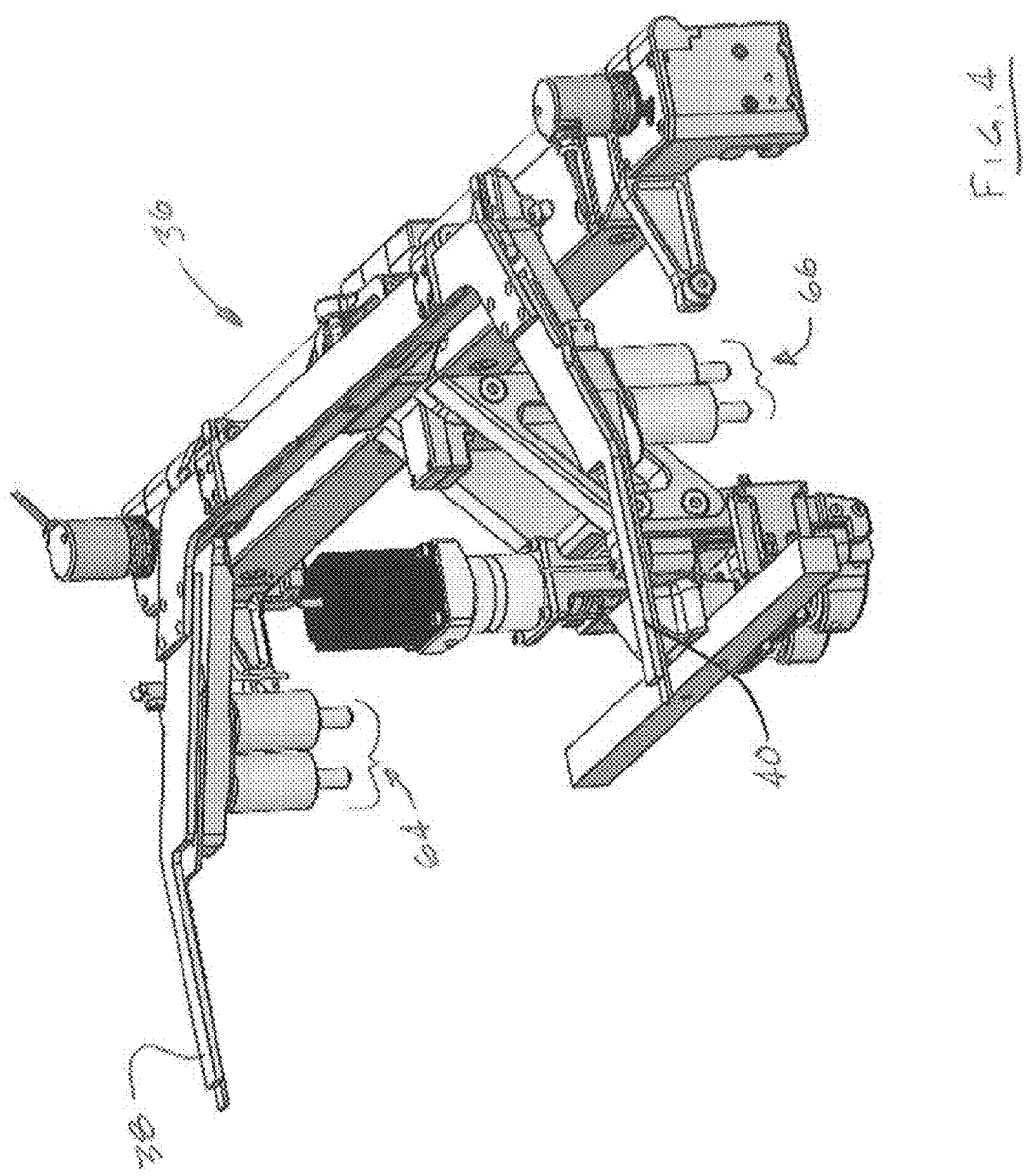

RACKING SYSTEM FOR ELECTRICAL EQUIPMENT

CROSS-REFERENCE TO RELATED APPLICATIONS

This application claims the benefit of U.S. provisional application Ser. No. 62/897,747 filed Sep. 9, 2019, which is hereby incorporated by reference herein in its entirety.

TECHNICAL FIELD

The present disclosure relates to a racking system and method for electrical equipment.

BACKGROUND

Because of high electrical demands in urban areas, the need for efficient circuit breaker restoration during peak operational seasons is very desirable. In an electrical substation, circuit breakers are used to interrupt any short-circuits or overload currents that may occur on the network. Some indoor electrical substations utilize 13 kilovolt (kV) and 27 kV circuit breakers that are racked in and out of position when (i) the feeder needs to be processed with a "ground-and-test" (G&T) device to support field fault locating, repair, and restoration activities, or (ii) if the circuit breaker installed in the cabinet needs to be swapped-out for maintenance or post trip-out investigations. The process of removing and installing the circuit breakers from their positions and moving them around the substation introduce a number of issues that need to be addressed.

Currently, the medium-voltage circuit breakers in a 13 kV switchgear lineup use a motor-operated or hand-cranked mechanism to separate the breaker from its enclosure. Each circuit breaker can weigh between 400 pounds (lb.) and 800 lb. and are provided with caster wheels to aid manual pushing by operators on the substation floor. Circuit breakers are typically housed in a metal enclosure—i.e., a cabinet—that also houses a circuit breaker racking mechanism. These cabinet lineups house multiple circuit breakers, any of which may need to be racked in or out at any point.

To remove a circuit breaker from the "connect" position, an operator may insert a racking tool into an opening on the circuit breaker door and into the racking mechanism. A hand crank is pushed-in to engage the racking mechanism within the cabinet and the operator manually cranks the tool to disengage the circuit breaker from the copper bus connections in the back of the cabinet. Occasionally during the course of "racking" a breaker—i.e., the act of removing or installing a circuit breaker—an electrical arc becomes uncontained, resulting in an undesirable arc flash. To help to ensure that operators and technicians are not exposed to an arc flash, and to make the racking of circuit breakers more efficient, an automated system and method for circuit breaker racking is needed.

SUMMARY

At least some embodiments described herein may include a system that may be used for racking a circuit breaker to and from an electrical cabinet or other electrical-connection station. The system may perform some or all of its functions autonomously, semi-autonomously, or through manual control. The system may be configured to work on circuit breakers, G&T devices, or other electrical equipment. A system and method for racking circuit breakers and other devices is described in U.S. patent application publication number US 2018/0205207 A1, entitled: *Circuit Breaker Racking System and Method*, published on Jul. 19, 2018, which is hereby incorporated herein by reference.

At least some embodiments described herein may include a system having a clamping arrangement with one or more movable jaws configured to secure a portion of the circuit breaker therebetween. In particular, the jaws may be configured to capture a front plate of a large circuit breaker so that it can be securely moved into and out of a storage structure, for example, an electrical cabinet. The clamping arrangement may include an elongated member configured to be positioned between the heads of fasteners on the circuit breaker to further secure the circuit breaker in the system. The system may include stationary or mobile components or subsystems, or some combination thereof. For example, the system may include a robotic system that may be completely autonomous, semi-autonomous, or remotely controlled to perform work on a circuit breaker or other electrical device.

Embodiments may also include a latch arrangement having one or more cabinet latches configured to cooperate with flanges or other features on a cabinet or other stationary apparatus to help maintain the system in a fixed position when racking a circuit breaker or other electrical device. In at least some embodiments, the one or more cabinet latches may be movable to help position the latches and then to attach it or them to a cabinet. A solenoid or other actuating device may be used to effect movement of the cabinet latches. At least some embodiments described herein may include a release arrangement actuated by one or more solenoids or other actuating devices. In at least some embodiments, the release arrangement may include a pair of arms configured to engage respective latch-release arms on a breaker to facilitate removal of the breaker from a cabinet.

Embodiments described herein may also include a system and method using scanner technology, such as laser scanners, to allow the system to align itself with an object of interest such as a free-standing device or an electrical cabinet. The system may be configured to recognize various features to determine the nature of the object it is sensing. In at least some embodiments, a laser projected onto a device is segmented and the length of each segment is evaluated to determine whether it represents a particular feature. As an alternative to or in conjunction with lasers, cameras or other types of sensors may be used. The system may be programmed to recognize features to identify a circuit breaker or other electrical device such as, for example, a G&T device. Embodiments may also be configured to identify types of objects such as electrical cabinets, transformers, relays, capacitor banks, batteries, meters, etc. The detected features of the target devices may be physical features on the front of the cabinets, breakers, and G&Ts, such as the width of the target—e.g., as determined by the outside edges—the width of specific features, for example, cabinet flanges, handles, or supports, or the relative positions between multiple features.

In at least some embodiments, the data gathered by the sensors may allow the system to determine the state of a particular device, for example, whether an electrical cabinet is loaded with a breaker or G&T device or whether it is empty. The sensors may also be used to determine a position and orientation of the electrical device and cabinet relative to a portion of the system such as a robotic system. Using a current state of the robotic system—e.g., a position and orientation of the robotic system and its subsystems—and the detected information about the devices, the robotic system can determine which set of automated procedures should be used to handle the detected device. Once an automated procedure has been selected the robotic system may use the determined information to automatically align with the target, driving itself to a position and orientation in front of the target that allows loading, unloading, or other automated operations. Using this process, the robotic system can pick up or put down a free-standing device or align with a cabinet to perform breaker operations.

In at least some embodiments, data from sensors may be used to generate a two-dimensional (2-D) or three-dimensional (3-D) point cloud of the area in front of the robotic system. This point cloud may then be filtered to remove noise and outlier measurements and segmented into groups of related points. Segmentation can be configured so that points in groups are related to one another by various metrics—e.g., the points in a group could be close together or part of the same line, plane, circle, or other geometric shape. These groups of points may be used to represent a collection of individual geometric features of the environment in front of the robotic system. These features may then be compared, individually or in various combinations, against a list or database of known features for desired targets. A match may indicate that a desired target's features have been detected in the environment in front of the robotic system, which may then proceed to determine additional information about the target, such as position, orientation, state, etc.

At least some embodiments described herein may include a circuit breaker racking system including a movable support structure for receiving and carrying a circuit breaker, and a clamping arrangement configured to secure a portion of the circuit breaker to the clamping arrangement for moving the circuit breaker into and out of a storage structure. A latch arrangement may be configured to engage a portion of the storage structure to inhibit relative movement between the support structure and the storage structure, and a release arrangement may be configured to open a locking mechanism securing the circuit breaker to the storage structure.

At least some embodiments described herein may include a circuit breaker racking system including a circuit breaker racking system having a support structure for receiving and carrying a circuit breaker. The system may further include a clamping arrangement including a pair of jaws, with at least one of the jaws being movable relative to the other jaw for securing a portion of the circuit breaker between the jaws. A latch arrangement may be configured to automatically engage a portion of the storage structure when the latch arrangement is disposed in a predetermined position relative to the storage structure. The system may further include a release arrangement configured to open a locking mechanism securing the circuit breaker to the storage structure.

At least some embodiments described herein may include a circuit breaker racking system that includes a support structure for receiving and carrying a circuit breaker, and a clamping arrangement carried by the support structure and configured to secure a portion of the circuit breaker to the support structure. The system may further include a latch arrangement configured to engage a portion of the storage structure to inhibit relative movement between the support structure and the storage structure, and a release arrangement configured to cooperate with a portion of the storage structure or the circuit breaker to facilitate disengagement of the circuit breaker from the storage structure.

BRIEF DESCRIPTION OF THE DRAWINGS

FIG. 1 shows a robotic system in accordance with embodiments described herein;

FIG. 2 shows a clamping arrangement from the robotic system shown in FIG. 1;

FIG. 3 shows a cabinet latch from the robotic system shown in FIG. 1;

FIG. 4 shows a release arrangement from the robotic system shown in FIG. 1;

DETAILED DESCRIPTION

Figure 5:
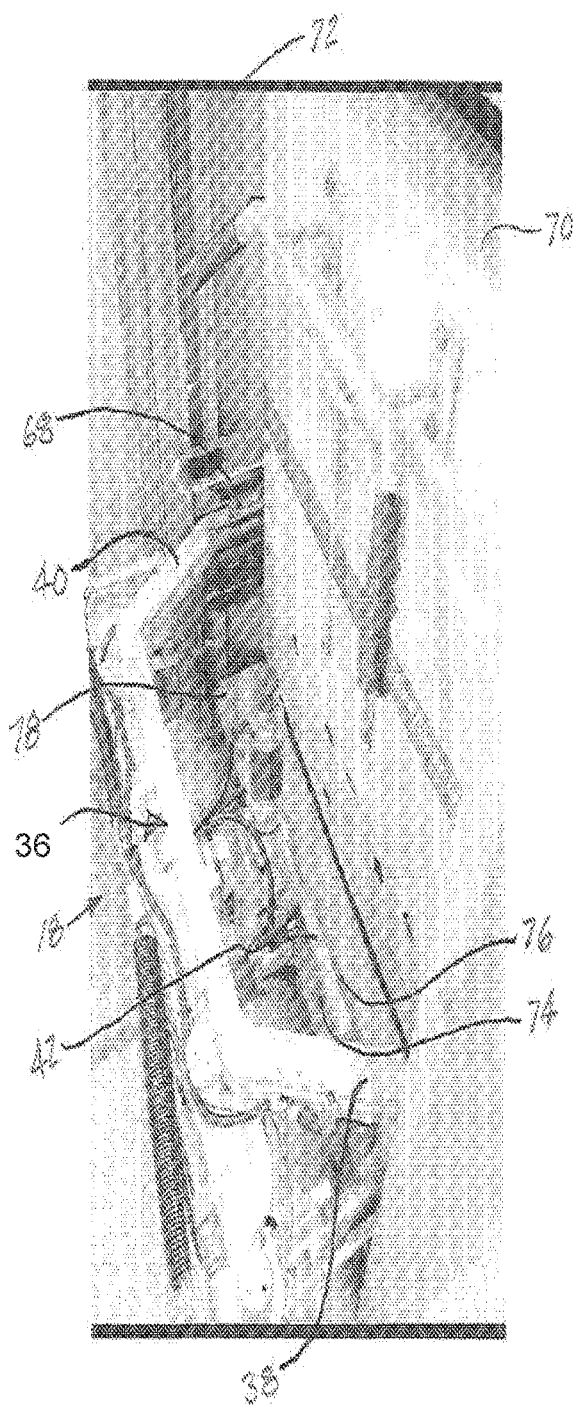
FIG. 5 shows the robotic system from FIG. 1 engaged with a circuit breaker in a circuit-breaker cabinet.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a racking system 10 for electrical devices, such as, for example, circuit breakers and G&T devices. The system 10 includes a support structure 12 that includes two arms 14, 16 and a carriage 18 movable along a length of the arms 14, 16. As described in more detail below, the support structure 12 is configured to receive and carry electrical equipment, such as a large circuit breaker. The entire system 10, including the support structure 12, is movable along four wheels 20, 22, 24, 26, which in this embodiment are Mecanum wheels. In other embodiments, a portion of a system—e.g., a support structure—may be stationary. The four Mecanum wheels 20, 22, 24, 26 allow the system 10 to move in virtually any direction without the need to have the wheels rotate around vertical axes. Movement of the system 10 may be autonomous, semi-autonomous, or manual. Any number of sensors, including laser sensors, cameras and other sensors may be employed by the system 10 to help guide its movements. In at least some embodiments, preprogrammed algorithms may contain a set of instructions or procedures for the system 10 to execute. Inputs from the sensors may be used by the system 10 to determine which of the instructions or procedures to follow.

The system 10 includes a clamping arrangement 28, which is attached to and movable with the carriage 18. The clamping arrangement 28 is configured to clamp onto and secure a portion of a circuit breaker or other electrical device to the clamping arrangement 28 so that it can be moved to or from another location, or into or out of an electrical cabinet—see, e.g., the circuit-breaker cabinet 72 shown and described in conjunction with FIG. 5. The system 10 also includes a latch arrangement 30, which is also attached to and movable with the carriage 18. The latch arrangement 30 includes a pair of cabinet latches 32, 34, and as explained in more detail below in conjunction with FIGS. 4 and 5 is configured to secure the system 10 in place while it moves an electrical device forward, for example, into a storage structure such as the electrical cabinet 72. The latch arrangement 30 is configured to automatically engage a portion of the storage structure to inhibit relative movement between the support structure 12 and the storage structure. The system 10 also includes a release arrangement 36 having a pair of movable arms 38, 40, and as explained in more detail below in conjunction with FIGS. 4 and 5 is configured to actuate a lock or locks on an electrical cabinet to facilitate removal of an electrical device such as a circuit breaker. As shown in FIG. 1, the clamping arrangement 28 further includes an elongated member, which in this embodiment is a cross bar 42. The cross bar 42 works in conjunction with jaws 44, 46 of the clamping arrangement 28 to secure an electrical device for moving. As described in more detail in conjunction with FIG. 5, the cross bar 42 is positionable to cooperate with a feature of the electrical device to further secure it to the clamping arrangement 28.

FIG. 2 shows at least a portion of the clamping arrangement 28 removed from the rest of the system 10. The clamping arrangement 28 includes a pair of jaws 44, 46, which in this embodiment are linearly movable along a fixed rail 48. In other embodiments, only one of the jaws 44, 46 may be movable relative to the other of the jaws 44, 46. In the embodiment shown in FIG. 2, movement of the jaws 44, 46 is effected by a motor 50, although in other embodiments a different actuator or actuators may be used. The clamping arrangement 28 also includes a pair of compression springs 51, 52, which provide compliance and greater control over the clamping force of the jaws 44, 46. The jaws 44, 46 may be opened when approaching a breaker or other electrical device, the carriage 18 may then be moved forward until a front plate or other feature of the electrical device is inserted between the jaws 44, 46, and finally the motor 50 may be actuated to close the jaws 44, 46, and position the cross bar 42 adjacent a feature on the electrical device, to secure the electrical device to the clamping arrangement 28—see also FIG. 5.

FIG. 3 shows a portion of the latch arrangement 30, and in particular the cabinet latch 34, which is configured as a mirror image of the latch 32 on the other side of the carriage 18. As shown in FIG. 3, the latch 34 includes an insertion portion 54 and a locking portion 56. In the embodiment shown in FIG. 3, the insertion portion 54 is angled to facilitate insertion into an electrical cabinet in a forward direction as indicated by the directional arrow 58. More specifically, the latch 34 is moved forward until a contact surface 59 of the insertion portion 54 contacts a mating portion of the electrical cabinet. Forward movement of the latch 34 is continued until the mating portion of the electrical cabinet is past the insertion portion and is a secured by the locking portion 56.

The latch 34 includes an elongated member, or latch arm 60, which carries the insertion portion 54 and the locking portion 56. The latch arm 60 may be relatively compliant—e.g., laterally flexible—so that in conjunction with the angled insertion portion 54, the latch arrangement 30 may be inserted into a cabinet even if the system 10 is not in exact alignment with the cabinet. In the embodiment shown in FIG. 3, the latch 34 may be moved laterally, or side-to-side, by actuating a solenoid 62. As the system 10 moves toward an electrical cabinet, the latch 34 may be pulled inward by the solenoid 62—it being understood that a similarly arranged solenoid may be used to pull the latch 32 inward on the other side of the carriage 18.

In the event of a misalignment where the contact surface 59 engages a portion of the electrical cabinet when the system 10 moves forward toward the electrical cabinet, the cooperation of the contact surface 59 with the electrical cabinet will cause the latch arm 60 to automatically move laterally so the system 10 can continue to move forward toward the electrical cabinet. This is a result of the oblique angle between the contact surface 59 and the forward direction of motion of the system 10, which is indicated by the directional arrow 58. After the carriage 18 is moved forward a certain amount, the latches 32, 34 may be released so that they can contact mating portions of the electrical cabinet to secure the system 10 in place as an electrical device is moved forward by the carriage 18 into the cabinet. More specifically, the locking portion 56 includes a locking surface 63 that engages with a mating surface on the electrical cabinet. In some embodiments, a solenoid, such as the solenoid 62 may be used to automatically move—e.g., through control software—the latches 32, 34 outward to engage the electrical cabinet; whereas, in other embodiments, the latches 32, 34 may automatically return outward under a spring force when the solenoid 62 is disengaged. Thus, the latch arrangement 30 is configured to automatically engage a portion of the electrical cabinet when the latch arrangement 30 is disposed in a predetermined position relative to the electrical cabinet.

FIG. 4 shows at least a portion of the release arrangement 36 detached from the rest of the system 10. As shown in FIG. 4, each of the arms 38, 40 is associated with a pair of solenoids 64, 66. The solenoids 64, 66 are configured to lift the arms 38, 40 to release locks on an electrical cabinet. This is illustrated in FIG. 5, which shows the arm 40 engaged with a respective latch, or lever arm 68 on a circuit breaker 70, which includes a second latch or lever arm with which the arm 38 will engage. Once the carriage 18 is in place as shown in FIG. 5, the release arrangement 36 can be actuated to lift the arms 38, 40 to lift the lever arm 68 and its counterpart lever arm on the other side of the circuit breaker 70; this unlocks the circuit breaker 70 from the electrical cabinet, or circuit-breaker cabinet 72. More specifically, each of the arms 38, 40 are configured to engage a respective latch on the circuit breaker 70—the latches being a part of a locking mechanism connecting the circuit breaker 70 to the electrical cabinet 72—and move the respective latch to an unlatched positioned to facilitate removal of the circuit breaker from the storage structure. In other embodiments, a release arrangement, such as the release arrangement 36, may be configured to engage a latch on the circuit-breaker cabinet 72 or another structure to which a circuit breaker is attached. Also shown in FIG. 5 is the cross bar 42 positioned between fasteners 74, 76 on one side of a front plate 78 of the circuit breaker 70. Depending on the configuration of a circuit breaker, the cross bar 42 may also be positioned between fasteners on the opposite side of the front plate of the circuit breaker.

Figure 6:
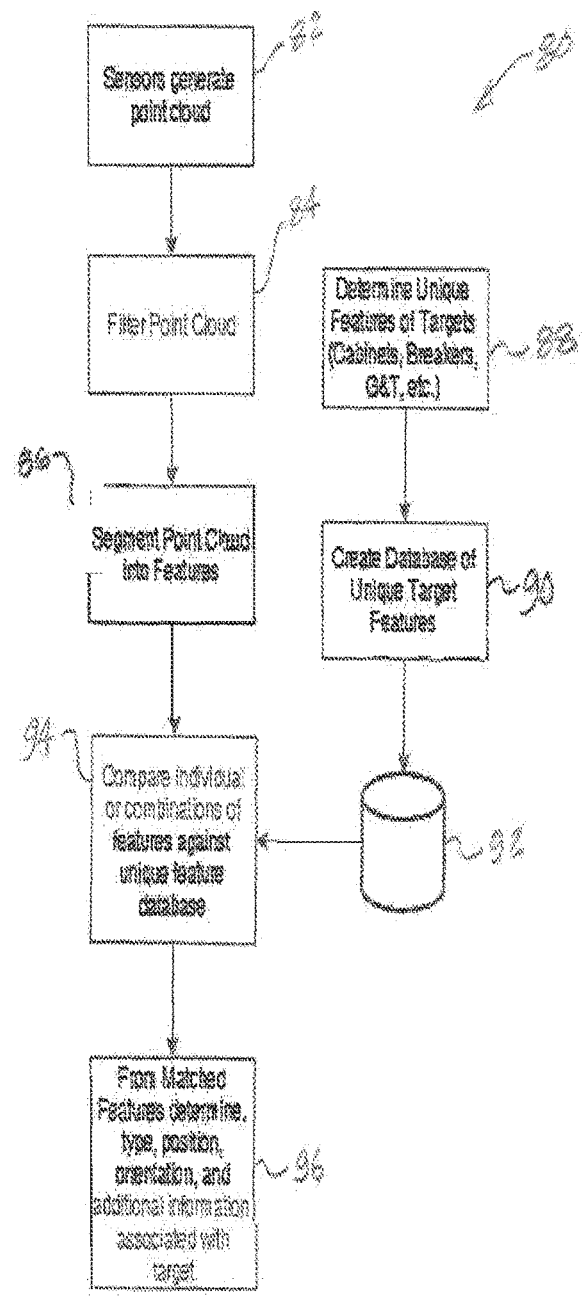
FIG. 6 shows a flowchart describing a method in accordance with embodiments described herein.

As described above, embodiments may also include a system and method for feature identification and localization. FIG. 6 shows a flowchart 80 illustrating an embodiment of a method described herein. Although the steps described in the flowchart 80 are shown sequentially in some cases and in parallel in others, other embodiments may perform these steps in a different order and may include additional steps or fewer steps than shown in the flowchart 80. At step 82, sensors such as described above in conjunction with the system 10—e.g., laser sensors, cameras, etc.—gather data associated with particular physical features of an electrical device or storage unit, such as a circuit-breaker cabinet. This data is then processed to generate a 2-D or 3-D point cloud of an area in front of the system 10. At step 84 the data is filtered to remove noise and outlier measurements, which may be indicative of anomalous readings. At step 86, the point cloud is segmented into specific features of interest, such as latches on an electrical cabinet, a front plate of a circuit breaker, etc.

Prior to using the data from the segmented point cloud, various features on electrical devices or storage units, or other systems of interest, are identified and labeled so that they may be retrieved electronically and used in an analysis—see step 88. In at least some embodiments these features may include some or all of the following: frame edges, corners, racking shutters, guide rails, racking nuts, primary disconnects, secondary disconnects, and nameplates for an electrical-device cabinet. Similarly, for an electrical device such as a circuit breaker or G&T, features may include some or all of the following: edges, corners, latch bars for unlocking the electrical device from a cabinet, handles, switches, buttons, receptacles, and nameplates. Depending on the particular cabinet or electrical device, other features may be used. Next, a database is created from these identified and labeled features—see step 90 and database 92. Returning to step 86, the segmented-point-cloud data is then used at step 94, which accesses the database 92 to compare the features from the segmented-point-cloud data with previously identified features programmed into the database 92. Finally, at step 96, certain features are matched and information about them can then be determined, such as the type, position, orientation, etc. of these features. This information may then be used by a system such as the system 10 to orient itself in relation to the electrical device or storage unit, it may be used to determine which instructions or procedures it needs to execute, and in general it may be used to allow a system such as the system 10 to perform its functions in an autonomous or semi-autonomous fashion.

As noted above, some embodiments may use one or more lasers as part of the system. Referring again to FIG. 1, lasers 98, 100 are shown mounted to the support structure 12. One embodiment of a method for using a laser to identify features of a structure—e.g., to orient the system 10—is described as follows. Laser lines projected from the lasers 98, 100 onto the sides of a structure, such as the storage structure 72, are processed into point-cloud data. Because the vertical sides of the storage structure 72 have a known width—e.g., as specified by the manufacturer—this dimension serves as a known reference. Upon line fitting and segmentation of the point clouds, the sizes of the laser lines are determined by a computer program. Additionally, since the sides of the storage structure 72 are stepped, more than one segment of a laser line can be detected, and the size of each segment reported along with the depth of each point along the line segments. The detection of a single edge of the storage structure is sufficient for the determination of the orientation and position of the support structure 12 relative to the storage structure 72. This is because the storage structure dimensions such as total width and spacing between the inner edges are fixed by the manufacturer's specification. The difference in depth between the endpoints of the line segment indicate the angle of the storage structure 72 relative to the support structure 12. The depth of any point on the line segment indicates the distance between the support structure 72 and that point.

Through coordinate transformations, the depth and angle information calculated is used to correct the position of the support structure 12. Detection of both edges of the storage structure 72 can increase the accuracy of alignment as more laser line segments from the known reference surfaces can be used to determine the misalignment. The same approach described above may also be used to determine the horizontal width of a G&T device. As the width of each device is different, each device can be classified simply based on width of the line segment detected from the point cloud. The presence of edges having known widths on the storage structure 72 is used to distinguish the storage structure 72 from other devices, such as G&T devices. Additionally, the presence of another feature on a G&T device—e.g., a rectangular shaped bar having a known fixed width—may be used to classify this device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A circuit breaker racking system, comprising:
    a movable support structure for receiving and carrying a circuit breaker;
    a clamping arrangement including a pair of jaws configured to secure a portion of the circuit breaker to the clamping arrangement for moving the circuit breaker into and out of a storage structure;
    at least one of the jaws of the pair of jaws being movable relative to the other of the jaws for securing a portion of the circuit breaker between the pair of jaws;
    an elongated member attached to and movable with one of the jaws being configured to cooperate with at least one feature of the circuit breaker to further secure the circuit breaker to the clamping arrangement;
    a latch arrangement configured to engage a portion of the storage structure to inhibit relative movement between the support structure and the storage structure; and
    a release arrangement configured to open a locking mechanism securing the circuit breaker to the storage structure.

2. The circuit breaker racking system of claim 1, wherein the latch arrangement includes at least one latch arm disposed on the support structure and having a respective insertion portion and a respective locking portion.

3. The circuit breaker racking system of claim 1, further comprising an insertion point and an at least one latch arm, wherein the insertion portion of each of the at least one latch arm includes a contact surface forming an oblique angle with a forward direction of motion of the support structure such that the contact surface contacts a portion of the storage structure and automatically moves the at least one latch arm laterally in a first direction when the support structure moves forward and the contact surface engages the storage structure.

4. The circuit breaker racking system of claim 1, further comprising an at least one latch arm and a contact surface, wherein the at least one latch arm is configured to automatically move laterally in a second direction opposite a first direction when the support structure moves forward such that the contact surface disengages the support structure.

5. The circuit breaker racking system of claim 1, further comprising an at least one latch arm, a contact surface, and a locking portion, wherein the locking portion of each of the at least one latch arm includes a locking surface configured to automatically engage the support structure after the support structure moves forward such that the contact surface disengages the support structure.

6. The circuit breaker racking system of claim 1, wherein the release arrangement includes at least one movable arm configured to engage a respective latch on one of the storage structure or the circuit breaker and move the respective latch to an unlatched position to facilitate removal of the circuit breaker from the storage structure.

7. The circuit breaker racking system of claim 1, further comprising at least one sensor configured to identify at least one physical feature on at least one of the circuit breaker or the storage structure for orienting the support structure.

8. A circuit breaker racking system, comprising:
- a movable support structure for receiving and carrying a circuit breaker;
- a clamping arrangement configured to secure a portion of the circuit breaker to the clamping arrangement for moving the circuit breaker into and out of a storage structure;
- a latch arrangement configured to engage a portion of the storage structure to inhibit relative movement between the support structure and the storage structure; and
- a release arrangement configured to open a locking mechanism securing the circuit breaker to the storage structure, wherein the release arrangement includes at least one movable arm configured to engage a respective latch on one of the storage structure or the circuit breaker and move the respective latch to an unlatched position to facilitate removal of the circuit breaker from the storage structure.

9. The circuit breaker racking system of claim 8, wherein the latch arrangement includes at least one latch arm disposed on the support structure and having a respective insertion portion and a respective locking portion.

10. The circuit breaker racking system of claim 8, further comprising an at least one latch arm and a contact surface, wherein the at least one latch arm is configured to automatically move laterally in a second direction opposite a first direction when the support structure moves forward such that the contact surface disengages the support structure.

11. The circuit breaker racking system of claim 8, further comprising at least one sensor configured to identify at least one physical feature on at least one of the circuit breaker or the storage structure for orienting the support structure.

* * * * *